US012603979B2

(12) United States Patent
Ollila et al.

(10) Patent No.: US 12,603,979 B2
(45) Date of Patent: Apr. 14, 2026

(54) PROCESSING IMAGES USING NEURAL STYLE TRANSFER NETWORK

(71) Applicant: Varjo Technologies Oy, Helsinki (FI)

(72) Inventors: Mikko Ollila, Helsinki (FI); Mikko Strandborg, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 67 days.

(21) Appl. No.: 18/467,850

(22) Filed: Sep. 15, 2023

(65) Prior Publication Data

US 2025/0097395 A1 Mar. 20, 2025

(51) Int. Cl.
*H04N 13/156* (2018.01)
*H04N 13/383* (2018.01)

(52) U.S. Cl.
CPC ......... *H04N 13/156* (2018.05); *H04N 13/383* (2018.05)

(58) Field of Classification Search
CPC ............................ H04N 13/156; H04N 13/383
USPC .......................................................... 348/47
See application file for complete search history.

(56) References Cited

U.S. PATENT DOCUMENTS

| | | | | |
|---|---|---|---|---|
| 12,183,050 | B1 * | 12/2024 | Khinvasara | G06N 3/045 |
| 2016/0147083 | A1 * | 5/2016 | Stevens | G02C 11/10 |
| | | | | 351/204 |
| 2018/0249148 | A1 * | 8/2018 | Roulet | H04N 23/698 |
| 2020/0252596 | A1 * | 8/2020 | Roulet | H04N 13/239 |
| 2022/0174213 | A1 * | 6/2022 | Hanchate | G06F 1/1686 |
| 2022/0222496 | A1 * | 7/2022 | Ryan | G06V 10/25 |
| 2023/0291982 | A1 * | 9/2023 | Chen | H04N 23/85 |
| 2024/0312123 | A1 * | 9/2024 | Anwar | G06T 19/006 |
| 2024/0314452 | A1 * | 9/2024 | Ollila | G06T 5/00 |
| 2024/0419382 | A1 * | 12/2024 | Dekel | G06V 10/761 |

* cited by examiner

*Primary Examiner* — Gims S Philippe
(74) *Attorney, Agent, or Firm* — Ziegler IP Law Group, LLC.

(57) ABSTRACT

Disclosed is a system with server(s) configured to: obtain a plurality of input images captured by a plurality of input cameras comprising at least a first input camera per eye and a second input camera per eye, wherein a first field of view of the first input camera is narrower than a second field of view of the second input camera and is overlapping with an overlapping portion of the second field of view, the plurality of input images comprising at least a first input image and a second input image captured by the first input camera and the second input camera, respectively; and process the plurality of input images, by using neural style transfer network(s), to generate a single output image per eye.

13 Claims, 2 Drawing Sheets

PROCESSING IMAGES USING NEURAL STYLE TRANSFER NETWORK

TECHNICAL FIELD

The present disclosure relates to systems for processing images using neural style transfer networks. The present disclosure also relates to methods for processing images using neural style transfer networks.

BACKGROUND

Nowadays, extended-reality (XR) devices are increasingly incorporating multiple cameras per eye, for providing a rich real-world viewing experience in an XR environment. For example, the multiple cameras per eye could be wide-angle cameras, telephoto cameras, and the like. These multiple cameras can not only have different fields of view, but can also have various other differing characteristics that cause images captured by them to look quite different from each other. Some examples of such differing characteristics are lens distortion profiles, noise structures and noise shapes (due to different image sensor types, pixel sizes, pixel patterns, and similar), colour profiles, image signal processor and imaging pipelines, angular resolution (such as in terms of pixels per degree), sensitivity and brightness, gamma correction, physical locations, exposure times, and the like.

For leveraging various features offered by the multiple cameras, the images captured by the multiple cameras having differing characteristics are sometimes fused into a single image. In such a case, one or more of such images are corrected by performing image processing operations thereon. Typically, multiple separate image processing operations are performed on each of such images that are to be fused into the single image. Performing such multiple separate image processing operations is complex, cumbersome, time-consuming and processing-resource intensive. Moreover, the resulting single image still does not have high visual quality (for example, in terms of high resolution) throughout its field of view, and it rather has visual artifacts such as flying pixels (i.e., random isolated pixels that appear to fly across said image) due to un-distortion or noise, differences in brightness across said image, and the like. This often leads to a sub-optimal (i.e., lack of realism), non-immersive viewing experience for a user viewing such images.

Therefore, in light of the foregoing discussion, there exists a need to overcome the aforementioned drawbacks.

SUMMARY

The present disclosure seeks to provide a system and a method for generating output images having high quality and uniformity throughout their field of view, in real time or near-real time. The aim of the present disclosure is achieved by a system and a method for processing images using neural style transfer network(s), as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
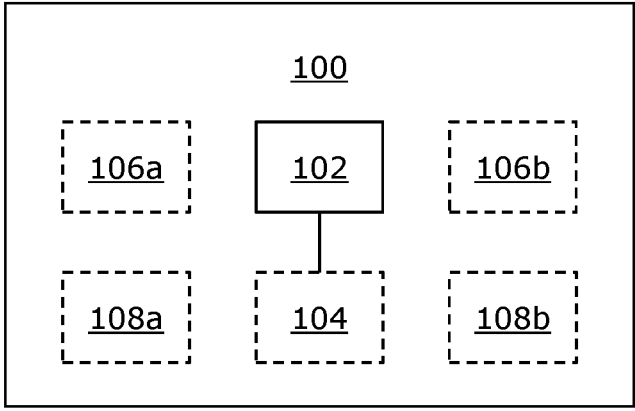
FIG. 1 illustrates a block diagram of an architecture of a system for processing images using a neural style transfer network, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising at least one server configured to:

obtain a plurality of input images captured by a plurality of input cameras comprising at least a first input camera per eye and a second input camera per eye, wherein a first field of view of the first input camera is narrower than a second field of view of the second input camera and is overlapping with an overlapping portion of the second field of view, the plurality of input images comprising at least a first input image and a second input image captured by the first input camera and the second input camera, respectively; and process the plurality of input images, by using at least one neural style transfer network, to generate a single output image per eye.

In a second aspect, an embodiment of the present disclosure provides a method comprising:

obtaining a plurality of input images captured by a plurality of input cameras comprising at least a first input camera per eye and a second input camera per eye, wherein a first field of view of the first input camera is narrower than a second field of view of the second input camera and is overlapping with an overlapping portion of the second field of view, the plurality of input images comprising at least a first input image and a second input image captured by the first input camera and the second input camera, respectively; and processing the plurality of input images by using at least one neural style transfer network, to generate a single output image per eye.

The present disclosure provides the aforementioned system and the aforementioned method for processing the plurality of input images to generate the single output image having high quality and uniformity throughout its field of view, in computationally-efficient and time-efficient manner.

Herein, the at least one neural style transfer network is used to perform a style transfer on at least the first input image and the second input image (which represent a same real-world region of a real-world environment) and then to blend the aforesaid input images to generate the single output image. Such a style transfer is performed on these input images to adopt/match a same style, for example, a style of high-resolution images captured by the first input camera or some other high-resolution reference images. The single output image generated in this way is highly realistic (for example, in terms of representing colours and textures, having a high resolution, having a uniform brightness, being artifacts-free, and the like), visually-pleasing and contextually-coherent and consistent throughout its field of view. Processing the plurality of input images using the at least one neural style transfer network 5 facilitates in utilising computational resources of the at least one server in an efficient manner, thereby reducing delays and excessive power consumption. This may facilitate an increase in an overall efficiency of the at least one server, and makes the system and the method suitable for use with demanding applications (such as extended-reality (XR) applications). The system and the method is susceptible to be used for generating the single output image despite the fact that the first input camera and the second input camera not only have different fields of view, but can also have various other differing characteristics, for example, such as different lens distortion profiles, different noise structures and different noise shapes (due to different image sensor types, pixel sizes, pixel patterns, and similar), different colour profiles, different image signal processor and imaging pipelines, different angular resolution (such as in terms of pixels per degree), different sensitivities and brightness, different gamma corrections, different physical locations, different exposure times, and the like. The system and the method are simple, robust, fast, reliable, and can be implemented with ease.

Throughout the present disclosure, the term "input camera" refers to an equipment that is operable to detect and process light signals received from a real-world environment, so as to capture input image(s) of the real-world environment. Optionally, a given input camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, and a monochrome camera. Alternatively, optionally, the given input camera is implemented as a combination of a visible-light camera and a depth camera. Examples of the depth camera include, but are not limited to, a Red-Green-Blue-Depth (RGB-D) camera, a ranging camera, a Light Detection and Ranging (LiDAR) camera, a Time-of-Flight (ToF) camera, a Sound Navigation and Ranging (SONAR) camera, a laser rangefinder, a stereo camera, a plenoptic camera, and an infrared (IR) camera. As an example, the given input camera may be implemented as a stereo camera. The term "given input camera" encompasses the first input camera and/or the second input camera.

It will be appreciated that a given input image is a visual representation of the real-world environment. The term "visual representation" encompasses colour information represented in the given input image, and additionally optionally other attributes associated with the given input image (for example, such as depth information, luminance information, transparency information (namely, alpha values), polarization information, and the like). Optionally, the colour information represented in the given input image is in form of at least one of: Red-Green-Blue (RGB) values, Red-Green-Blue-Alpha (RGB-A) values, Cyan-Magenta-Yellow-Black (CMYK) values, Luminance and two-colour differences (YUV) values, Red-Green-Blue-Depth (RGB-D) values, Hue-Chroma-Luminance (HCL) values, Hue-Saturation-Lightness (HSL) values, Hue-Saturation-Brightness (HSB) values, Hue-Saturation-Value (HSV) values, Hue-Saturation-Intensity (HSI) values, blue-difference and red-difference chroma components (YCbCr) values. The term "given input image" encompasses the first input image and/or the second input image.

The first input image and the second input image are captured simultaneously (i.e., at a same time), via the first input camera and the second input camera, respectively. Notably, since the first field of view is narrower than the second field of view (namely, the second field of view is wider than the first field of view), and the first field of view (fully) overlaps with the corresponding portion of the second field of view, the first input image represents a given region of the real-world environment (that corresponds to the first field of view), whereas the second input image represents other region(s) of the real-world environment (that corresponds to a remaining (non-overlapping) portion of the second field of view), in addition to the given region of the real-world environment.

It will be appreciated that since the first field of view is narrower than the second field of view, the first input camera may be considered to be a narrow-angle camera, while the second input camera may be considered to be a wide-angle camera. It will also be appreciated that the first input camera captures extremely high-resolution input images (representing objects or their parts present in the real-world environment in the first field of view), as compared to the second input camera. In other words, a first angular resolution of the first input camera is higher than a second angular resolution of the second input camera. Optionally, in this regard, the first angular resolution lies in a range of 20 pixels per degree (PPD) to 120 PPD, whereas the second angular resolution lies in a range of 10 PPD to 100 PPD. In an example, the first input camera may be implemented as a telephoto camera. Furthermore, there could also be other input cameras, in addition to the first input camera and the second input camera. For example, such other input cameras may comprise a depth camera per eye for capturing a plurality of depth images of the real-world environment, and at least one pair of stereo cameras for capturing a plurality of pairs of stereo images of the real-world environment.

Optionally, the first field of view has an angular width that lies in a range of 5 degrees to 45 degrees. As an example, the first field of view has the angular width may be from 5, 10, 20 or 35 degrees up to 15, 30 or 45 degrees. Optionally, the second field of view has an angular width that lies in a range of 50 degrees to 220 degrees. As an example, the second field of view has the angular width may be from 50, 60, 75, 90, 110, 130 or 160 degrees up to 120, 135, 150, 180 or 220 degrees.

Optionally, an optical axis of the second input camera is arranged at an angle that is lower than a predefined threshold angle with respect to an optical axis of the first input camera, such that the first field of view fully overlaps with the overlapping portion of the second field of view. In such a case, the first field of view could (almost) be at a middle of the second field of view. This may, for example, be beneficial when determining a corresponding portion of the second input image that pertains to the overlapping portion of the second field of view, because said corresponding portion could lie (almost) at a middle of the given second input image (as discussed later). Optionally, the predefined threshold angle lies in a range of 5 degrees to 30 degrees. As an example, the predefined threshold angle may be from 5, 10, 15 or 20 degrees up to 10, 20 or 30 degrees.

Notably, the at least one server controls an overall operation of the system. The at least one server is communicably coupled to at least the first input camera and the second input camera. The at least one server may be understood to be a compositor (namely, a processing unit configured to perform at least compositing tasks pertaining to generation of the single output image). The compositor is a software module taking various inputs (such as at least the first input image and the second input image) and composing (namely, generating) the single output image by way of using the at least one neural style transfer network (as discussed later). The single output image may be subsequently displayed via a given light source. Optionally, the given light source is implemented as a display or a projector. Displays and projectors are well-known in the art.

In some implementations, the at least one server is implemented as a remote server. In an example, the remote server could be a cloud server that provides a cloud computing service, and could be arranged in a geographical location that is different from a geographical location of the plurality of input cameras. In other implementations, the at least one server is implemented as a processor of a computing device that is communicably coupled to at least one client device. Examples of the computing device include, but are not limited to, a laptop, a desktop, a tablet, a phablet, a personal digital assistant, a workstation, and a console. Optionally, the system further comprises the plurality of input cameras. It will be appreciated that the term "at least one server" refers to "a single server" in some implementations, and to "a plurality of servers" in other implementations.

The at least one client device could be implemented as a display device, or as another device serving the display device. Examples of the display device include, but are not limited to, a head-mounted display (HMD) device, and a smartphone. As an example, a smartphone can be inserted into a viewer made from cardboard, to display output images to the user. The term "head-mounted display" device refers to a specialized equipment that is configured to present an extended-reality (XR) environment to a user when said HMD device, in operation, is worn by a user on his/her head. The HMD device is implemented, for example, as an XR headset, a pair of XR glasses, and the like, that is operable to display a scene of the XR environment to the user. The term "extended-reality" encompasses virtual reality (VR), augmented reality (AR), mixed reality (MR), and the like.

In an example implementation, when the at least one server is implemented as the processor of the computing device that is coupled to the at least one client device (for example, the HMD device), the plurality of input cameras are optionally arranged on the at least one client device. In this regard, a first input camera and a second input camera corresponding to a first eye of a user of the at least one client device, and a first input camera and a second input camera corresponding to a second eye of said user may be arranged to face the real-world environment in a manner that a distance between the aforesaid input cameras corresponding to the first eye and the aforesaid input cameras corresponding to the second eye is equal to an interpupillary distance (IPD) between the first eye and the second eye.

Typically, the neural style transfer network is a deep learning model (namely, a machine learning-based model) that is capable of extracting visual content information from a given image and style information from another given image, and then combining the visual content information of the given image with the style information of the another given image, to generate an output image that blends both the visual content information and the style information. The "visual content information" of the given image refers to comprehensive information pertaining to visual content represented in the given image. Such comprehensive information may be indicative of at least one of: an environment represented in the given image, object or their parts present in said environment, surfaces of the objects or their parts, a plurality of features of the objects or their parts, shapes and sizes of the objects or their parts, poses of the objects or their parts, materials of the objects or their parts, colour information of the objects or their parts, depth information of the objects or their parts, light sources and lighting conditions within said environment. The term "object" refers to a physical object or a part of the physical object that is present in said environment. An object could be a living object (for example, such as a human, a pet, a plant, and the like) or a non-living object (for example, such as a wall, a building, a shop, a road, a window, a toy, a poster, a lamp, and the like). Examples of the plurality of features include, but are not limited to, edges, corners, blobs, high-frequency features, low-frequency features, and ridges.

For the at least one neural style transfer network to extract the visual content information of the given image, a deep convolutional neural network (CNN) is utilised. The CNN could, for example, be implemented as VGGNet (Visual Geometry Group Network), Residual Neural Network (ResNet), a feature extractor, and the like. Typically, the CNN is pre-trained on a large dataset for image recognition tasks, such as ImageNet, to learn to determine the aforesaid comprehensive information in a plurality of images. During this pre-training, the CNN learns to extract different levels of visual features from the plurality of images, starting from simple and low-level details (such as edges, textures, and the like) to more complex and high-level semantics (e.g., objects, scenes) of the plurality of images. Thereafter, the visual content information of the given image is represented by using feature maps, obtained from one of intermediate layers of the CNN. Such feature maps are activation maps of neurons in the CNN, which capture specific visual patterns and activations in response to different parts of the given image. The feature maps encode various levels of abstraction of the given image, and comprise information pertaining to both low-level details and high-level semantics of the given image. By using the feature maps, the at least one neural style transfer network performs a content transfer, wherein the visual content information of the (original) given image is retained/preserved in the output image, when the output image is being generated in a style of the another given image, as discussed hereinbelow.

Furthermore, the "style information" of the another given image refers to comprehensive information pertaining to an artistic appearance and visual characteristics in the another given image, which provides a distinct style, aesthetics, and artistic flair to the another given image. Such comprehensive information is indicative of at least one of: features (such as corners, edges, contours, and the like) of the objects or their parts, shapes and sizes of the objects or their parts, textures present in the another given image, colour histogram of the another given image, colour moments in the another given image, local binary patterns in the another given image, a type of environment represented in the another given image. For the at least one neural style transfer network to extract the style information of the another given image, the CNN is utilised. The style information of the another given image is characterized by correlations between different feature maps obtained from different layers of the CNN. Such correlations capture statistical relationships of visual characteristics, brushwork, colours, and other artistic elements present in the another given image. The correlations may, for example, be computed using Gram matrices. By using these correlations, the at least one neural style transfer network performs a style transfer, wherein the style information of the another given image is transferred to the given image, in order to generate the output image in a style of the another given image.

Typically, when generating pixel values of pixels of the output image in an optimal manner, an aim of the at least one neural style transfer network is to minimize a content loss between the (generated) output image and the given image (whose visual content information is utilised), as well as a style loss between the (generated) output image and the another given image (whose style information content is utilised). In this regard, the content loss quantifies how different visual content of the output image is from visual content of the given image. In other words, the content loss measures a similarity between feature maps corresponding to the output image and the given image. The content loss may be computed a metric such as a Mean Squared Error (MSE). On the other hand, the style loss quantifies how different a style of the output image is from a style of the another given image. In other words, the style loss measures a dissimilarity between correlations of feature maps corresponding to the output image and the another given image, obtained from the different layers of the CNN. The style loss may be computed using a metric such as an MSE or a Frobenius norm of a matrix. Therefore, the at least one neural style transfer network defines a loss function that incorporates both the content loss and the style loss, and minimises said loss function through an iterative optimization process, such as gradient descent, in order to generate the pixel values of pixels of the output image. Using the at least one neural network for performing the content transfer and the style transfer to generate the output image is well-known in the art.

Optionally, the at least one server is configured to train the at least one neural style transfer network to generate output images in a style of any one of: a set of images captured by the first input camera, a set of reference images. In this regard, prior to using the at least one neural style transfer network, an input is provided to the at least one neural style transfer network in its training phase, wherein said input comprises a set of images captured by training cameras and one of: the set of images captured by the first input camera, the set of reference images. It will be appreciated that the training cameras could be same as the first input camera and/or the second input camera, or be closely similar to the first input camera and/or the second input camera, for example, in terms of their construction and working. An output of the at least one neural style transfer network comprises the output images.

It will also be appreciated that the at least one neural style transfer network is used to extract style information from the one of: the set of images captured by the first input camera, the set of reference images, and to perform a style transfer on the set of images captured by the training cameras for generating said output images. Moreover, the at least one neural style transfer network employs a loss function for determining (and continuously minimizing) a style loss (namely, an extent of dissimilarity) between the (generated) output images and the one of: the set of images captured by the first input camera, the set of reference images. The loss function and the style loss have already been described earlier in detail. The reason for adopting the style of the one of: the set of images captured by the first input camera, the set of reference images is that the set of images captured by the first input camera have extremely high resolution and represent high visual details, and the reference images are captured in ideal conditions (for example, using a default exposure setting to capture the reference images that are neither under exposed nor over exposed) and thus also represent high visual details. Therefore, the at least one neural style transfer network could easily consider the style of the one of: the set of images captured by the first input camera, the set of reference images as a ground truth style (namely, an ideal expected style), for generating the output images in its training phase. Greater the similarity in a style of the generated output images with the style of the one of: the set of images captured by the first input camera, the set of reference images, better is the training of the at least one neural style transfer network and higher is the probability of generating high-resolution and highly accurate output images in future using at least one trained neural style transfer network, and vice versa. The set of reference images could be captured, for example, using a high-quality professional camera having a high resolution (such as 60 PPD or more). Optionally, the input of the at least one neural style transfer network further comprises a set of auxiliary input images captured by a depth camera per eye and a set of pairs of stereo images captured by at least one pair of stereo cameras. This may facilitate in further improving training of the at least one neural style transfer network. Moreover, pose-tracking data (generated by pose-tracking means) may also be utilised (as the input) for further improving said training. Training the at least one neural style transfer network in this manner may also allow it to be used in an inference phase for beautification and stylification of the single output image. Training of the at least one neural style transfer network is well-known in the art.

Optionally, when processing the plurality of input images (namely, at least the first input image and the second input image), the at least one neural style transfer network is used to apply a same style transfer on both the first input image and the second input image, to generate a first style-transferred image and a second style-transferred image, respectively. Then, the at least one neural style transfer network is used to blend the first style-transferred image and the second style-transferred image according to any of the various embodiments discussed hereinbelow. The single output image generated in this manner is highly-realistic (for example, in terms of representing colours and textures, having a high resolution, having a uniform brightness, being artifacts-free, and the like), visually-pleasing and contextually-coherent and consistent throughout its entire field of view. It will be appreciated that since the plurality of input images represent a same real-world scene of the real-world environment, the visual content information of the plurality of input images does not change very drastically (as compared to the prior art wherein neural style transfer networks are used).

Optionally, when processing the plurality of input images, the at least one server is configured to use the at least one neural style transfer network to generate the single output image in a style of any one of: a set of images captured by the first input camera, a set of reference images. In this regard, once the at least one neural style transfer network is trained, it would automatically generate the single output image in the style of any one of: the set of images captured by the first input camera, the set of reference images. Thus, the one of: a set of images captured by the first input camera, a set of reference images need not be provided as the input to the at least one neural style transfer network during its inference phase (i.e., when the at least one neural style transfer network is utilised after it has been trained). In such a case, the at least one neural style transfer network performs a same style transfer on both the first input image as well as the second input image according to the style of any one of: the set of images captured by the first input camera, the set of reference images. It will be appreciated that the single output image preserves visual content information of both the first input image and the second input image whilst adopting the style of the one of: a set of images captured by the first input camera, a set of reference images. The style transfer has been already discussed earlier in detail.

In a first embodiment, when processing the plurality of input images, the at least one server is configured to use the at least one neural style transfer network to combine at least the first input image and the second input image, whilst blending the first input image with a corresponding portion of the second input image that pertains to the overlapping portion of the second field of view. Optionally, in this regard, an inner portion of the single output image is generated by blending the first input image with the corresponding portion of the second input image, and a peripheral portion of the single output image is generated from a style-transferred non-overlapping portion of the second input image that pertains to a non-overlapping portion of the second field of view, the peripheral portion surrounding the inner portion. The aforesaid combining and blending may be understood to be a mixture of a fusion of images and an image-to-image translation process.

Optionally, the at least one server is configured to use the at least one neural style transfer network to perform a style transfer on a non-overlapping portion of the second input image to generate the style-transferred non-overlapping portion of the second input image. In this regard, a pixel value of a pixel in the peripheral portion of the single output image is generated from a pixel value of a corresponding pixel in the style-transferred non-overlapping portion of the second input image.

Additionally, optionally, the at least one server is configured to use the at least one neural style transfer network to perform a style transfer on the first input image and the corresponding portion of the second input image to generate a first style-transferred input image and a style-transferred corresponding portion of the second input image, respectively. In this regard, a pixel value of a pixel in the inner portion of the single output image is generated by combining a pixel value of a pixel in the first style-transferred input image and a pixel value of a corresponding pixel in the style-transferred corresponding portion of the second input image. The aforesaid combination could be based on a weighted sum or a weighted average of the aforesaid pixel values. It is to be understood that a same style transfer is performed on both the first input image as well as the second input image (i.e., on both the corresponding portion and the non-overlapping portion of the second input image) according to a style of any one of: the set of images captured by the first input camera, the set of reference images (as discussed earlier).

It will be appreciated that since the first input image and the second input image are readily available to the at least one server, the at least one server can easily determine the corresponding portion of the second input image, as said corresponding portion corresponds to the first input image itself. Optionally, in this regard, the at least one server is configured to compare features extracted from the first input image with features extracted from the second input image, and a part of the second input image whose features correspond to the features extracted from the first input image is determined (namely, identified) as the corresponding portion of the second input image. In such a case, a remaining part of the second input image (that does not correspond to the first input image) is determined as the non-overlapping portion of the second input image. It will also be appreciated that the corresponding portion represents the given region of the real-world environment, whereas the non-overlapping portion represents the other region(s) of the real-world environment. Moreover, a given portion (i.e., the overlapping portion and/or the non-overlapping portion) of the second input image may or may not have a defined shape and/or size.

In a second embodiment, when processing the plurality of input images, the at least one server is configured to:

identify respective gaze regions in the first input image and the second input image, based on a given gaze direction; and use the at least one neural style transfer network to combine at least the first input image and the second input image, whilst blending the respective gaze regions of the first input image and the second input image.

In this regard, the respective gaze regions of the first input image and the second input image are identified dynamically according to the given gaze direction. According to known properties of the human visual system, a gaze region of a given input image is resolved to a much greater degree of visual detail by (a fovea of) the user's eye, as compared to a remaining region of the given input image. Such a dynamic manner of identifying the gaze region in the given input image and actively (i.e., dynamically) blending the respective gaze regions accordingly emulates a way in which the user actively focuses within his/her field of view. The term "gaze region" refers to a gaze-contingent region (i.e., region of interest) in a given image at which the user is looking or is going to look. The gaze region could, for example, be at a centre of the given input image, be a top-left region of the given input image, a bottom-right region of the given input image, or similar. Notably, the user is not shown any input image, but is instead shown the single output image (which could be displayed at the at least one client device). Optionally, the gaze region in the given input image has an angular width that lies in a range of 2 degrees to 5 degrees. In active foveation implementations, the given gaze direction could be a gaze direction of a user, or an average gaze direction of multiple users (in a multi-user scenario). The gaze direction of the user that is determined whilst the user views a given single output image is used for determining a gaze region in the given input image corresponding to a next single output image. Optionally, when determining the gaze region in the given input image, the at least one server is configured to map the gaze direction of the user to a corresponding region within the given input image.

Alternatively, in fixed-foveation implementations, the gaze region in the given input image is identified in a fixed manner, according to a centre of the given input image. In this regard, the given gaze direction is assumed to be directed along an optical axis of a given input camera (i.e., directed straight towards a centre of the single output image displayed at the at least one client device). Therefore, the at least one server is configured to determine the gaze region at the centre of the given input image. This is because a user's gaze is generally directed towards a centre of his/her field of view. When the user wants to view object(s) in a periphery of his/her field of view, the user typically turns his/her head in a manner that said object(s) lie at a centre of his/her current field of view. In such a case, a central portion of the user's field of view is resolved to a much greater degree of visual detail by the fovea of the user's eye, as compared to a peripheral portion of the user's field of view. The aforesaid fixed manner of identifying the gaze region in the given input image and blending the respective gaze regions (in a fixed manner) accordingly emulates a way in which users generally focus within their field of view.

Optionally, a gaze region of the single output image is generated by blending the respective gaze regions of the first input image and the second input image. It is to be understood that the gaze region of the single output image corresponds to the respective gaze regions of the first input image and the second input image. Optionally, in this regard, the at least one server is configured to use the at least one neural style transfer network to perform a style transfer on a gaze region of the first input image and a gaze region of the second input image to generate a style-transferred gaze region of the first input image and a style-transferred gaze region of the second input image, respectively. In such a case, a pixel value of a pixel in the gaze region of the single output image is generated by combining a pixel value of a pixel in the style-transferred gaze region of the first input image and a pixel value of a corresponding pixel in the style-transferred gaze region of the second input image. The technical benefit of blending only the respective gaze regions is that when the single output image is displayed to the user, the user would typically focus only on a small region of the single output image i.e., the gaze region of the single output image, and thus object(s) or their portions lying in said gaze region would be perceived in the single output image with high visual acuity by foveas of the user's eye, as compared to object(s) or their portions lying outside the gaze region in the single output image. Therefore, it would be beneficial to apply the style transfer only for the respective gaze regions (while said performing said blending). Beneficially, the generated single output image emulates image viewing quality and characteristics of the human visual system. This may also potentially facilitate in saving processing resources and processing time of the at least one server. The aforesaid combination could be based on a weighted sum or a weighted average of the aforesaid pixel values. It is to be understood that a same style transfer is performed on both the gaze region of the first input image as well as the gaze region of the second input image according to a style of any one of: the set of images captured by the first input camera, the set of reference images (as discussed earlier).

Additionally, optionally, when combining at least the first input image and the second input image, the at least one server is configured to use the at least one neural style transfer network to blend respective non-gaze regions of the first input image and the second input image in a conventional manner (i.e., without performing any style transfer on the respective non-gaze regions), the respective non-gaze regions surrounding the respective gaze region. In this regard, a pixel value of a pixel in a non-gaze region of the single output image is generated by combining a pixel value of a pixel in a non-gaze region of the first input image and a pixel value of a corresponding pixel in a non-gaze region of the second input image, the non-gaze region of the single output image surrounding the gaze region of the single output image. It will be appreciated that the inner portion of the single output image would be generated when the gaze region and the non-gaze region of the single output image are generated as described hereinabove. In some scenarios, it may not be necessary that the given input image comprises any gaze region, for example, when the given gaze direction does not lie within the corresponding portion of the second input image that pertains to the overlapping portion of the second field of view. In such scenarios, only the gaze region of the second input image would be utilised by the at least one neural style transfer network, to generate the gaze region of the single output image in a similar as the peripheral portion of the single output image is generated. It is to be understood that the peripheral portion of the single output image is generated in a same manner, as described in the aforesaid embodiment.

In a third embodiment, when processing the plurality of input images, the at least one server is configured to:
- identify respective gaze regions in the first input image and the second input image, based on a given gaze direction;
- detect when a gaze region of the second input image is in a proximity of a boundary between the overlapping portion of the second field of view and a non-overlapping portion of the second field of view;
- when it is detected that the gaze region is in the proximity of the boundary, identify respective surrounding regions in the first input image and the second input image that include and surround the respective gaze regions; and
- use the at least one neural style transfer network to combine at least the first input image and the second input image, whilst blending the respective surrounding regions of the first input image and the second input image.

In this regard, the respective gaze regions are identified in a same manner as discussed in the previous embodiment. Since the corresponding portion of the second input image and the non-overlapping portion of the second input image are already accurately known to the at least one server, the boundary between the overlapping portion and the non-overlapping portion of the second field of view could be easily ascertained. Moreover, a position of the gaze region of the second input image is also accurately known to the at least one server, thus the at least one server can easily detect whether the gaze region is in the proximity of said boundary, for example, based on a threshold distance between a gaze point within the gaze region and said boundary. Such a distance could, for example, be defined in terms of a number of pixels.

Once it is detected that the gaze region is in the proximity of the boundary, the respective surrounding regions are identified. The term "surrounding region" in a given input image refers to a region of the given input image that comprises a gaze region in the given input image and some extra (non-gaze) region surrounding the gaze region. In other words, the surrounding region can be understood to be an extended form of the gaze region. Optionally, the surrounding region in the given input image has an angular width that lies in a range of 3 degrees to 8 degrees.

It will be appreciated that detecting (and then subsequently blending) the respective surrounding regions would be beneficial, for example, in a scenario when the user's gaze is near the boundary. This is because when the single output image is displayed to the user, although the user would typically focus on the gaze region of the single output image (as discussed earlier), there may also be a likelihood that the user would also focus on a region immediately surrounding said gaze region. Therefore, when said gaze region is in the proximity of the boundary, the aforesaid blending is performed using the at least one neural style transfer network such that upon said blending, a transition between the inner portion and the peripheral portion of the single output image near the gaze region would be imperceptible (namely, unnoticeable) to the user viewing the single output image. In this way, object(s) or their portions lying inside and (closely) around said gaze region would be highly realistically and accurately generated in the single output image.

Optionally, a surrounding region of the single output image is generated by blending the respective surrounding regions of the first input image and the second input image. It is to be understood that the surrounding region of the single output image corresponds to the respective surrounding regions of the first input image and the second input image. Optionally, in this regard, the at least one server is configured to use the at least one neural style transfer network to perform a style transfer on a surrounding region of the first input image and a surrounding region of the second input image to generate a style-transferred surrounding region of the first input image and a style-transferred surrounding region of the second input image, respectively. In such a case, a pixel value of a pixel in the surrounding region of the single output image is generated by combining a pixel value of a pixel in the style-transferred surrounding region of the first input image and a pixel value of a corresponding pixel in the style-transferred surrounding region of the second input image. It is to be understood that a same style transfer is performed on both the surrounding region of the first input image as well as the surrounding region of the second input image according to a style of any one of: the set of images captured by the first input camera, the set of reference images (as discussed earlier). It is to be understood that remaining portions (for example, the non-gaze portion and the peripheral portion) of the single output image are generated in a same manner, as described earlier.

In a fourth embodiment, when processing the plurality of input images, the at least one server is configured to use the at least one neural style transfer network to combine at least the first input image and the second input image, whilst blending a transition region of the first input image with a transition region of the second input image, wherein an outer boundary of the transition region of the first input image and an outer boundary of the transition region of the second input image represent a boundary between the overlapping portion of the second field of view and a non-overlapping portion of the second field of view. Optionally, in this regard, an intermediate portion of the single output image is generated by blending the transition region of the first input image with a transition region of the second input image, the intermediate portion of the single output image lying between the inner portion and the peripheral portion of the single output image.

Optionally, the at least one server is configured to use the at least one neural style transfer network to perform a style transfer on the transition region of the first input image and the transition region of the second input image to generate a style-transferred transition region of the first input image and a style-transferred transition region of the second input image, respectively. In this regard, a pixel value of a pixel in the intermediate portion of the single output image is generated by combining a pixel value of a pixel in the style-transferred transition region of the first input image and a pixel value of a corresponding pixel in the style-transferred transition region of the second input image. It is to be understood that the inner portion and the peripheral portion of the single output image are generated in a same manner as discussed earlier in detail.

It will be appreciated that the intermediate portion of the single output image is generated to provide a smooth transition (namely, gradual blending or fusion) between the inner portion and the peripheral portion of the single output image. In other words, by generating said intermediate portion, a smooth imperceptible transition is provided between the inner portion and the peripheral portion of the single output image, as the inner portion appears to be well-blended with the peripheral portion when pixels in the intermediate portion are generated upon blending of the transition region of the first input image with the transition region of the second input image. Beneficially, this improves an overall immersiveness and realism of user's viewing experience when the single output image is presented to the user.

Optionally, a width of a transition region of a given input image and a width of the intermediate portion of the single output image lie in a range of 10 pixels to 300 pixels. More, optionally, a width of the transition region of the given input image and a width of the intermediate portion of the single output image lie in a range of 10 pixels to 200 pixels. It will be appreciated that alternatively, the width of the transition region of the given input image and the width of the intermediate portion of the single output image may be expressed in terms of degrees, for example, lying in a range of 1 degree to 15 degrees. It will be appreciated that the outer boundary of the transition region of the first input image fully overlaps with (namely, is same as) the outer boundary of the transition region of the second input image. Moreover, an inner boundary of the transition region of the first input image also fully overlaps with an inner boundary of the transition region of the second input image.

In an embodiment, said blending is performed using different blending weights for the first input image and the second input image. Optionally, in this regard, the at least one server is configured to use the at least one neural style transfer network to assign weights to pixels of the first input image and to pixels of the second input image. It will be appreciated that the different blending weights (for example, ranging from 0 to 1) could be assigned to the pixels of the first input image and to the pixels of the second input image either prior to performing the style transfer on the first input image and the second input image, or upon performing said style transfer. Such an assignment of weights could, for example, be based on an angular resolution of the first input image and an angular resolution of the second input image. As an example, when the angular resolution of the first input image is greater than the angular resolution of the second input image, a higher weight may be applied to a pixel value of a pixel of the first input image, as compared to a pixel value of a corresponding pixel (in the corresponding portion) of the second input image, and vice versa. As another example, when the angular resolution of the first input image is same as the angular resolution of the second input image, a weight factor of 0.50 may be used for both pixels of the first input image and corresponding pixels of the second input image. In an example, a weight of 0.85 may be applied to a pixel value of a pixel of the first input image, and a weight of 0.15 may be applied to a pixel value of a corresponding pixel of the corresponding portion of the second input image.

Optionally, the at least one neural style transfer network performs said blending by employing at least one of: Poisson blending, image blending using Laplacian pyramids, linear blending, non-linear blending, a maximum pixel value, a minimum pixel value, a simple block replacement, a max-min pixel value, a guided filtering, an average pixel value, a weighted average pixel value, a median pixel value.

It will be appreciated that in case of blending the transition region of the first input image with the transition region of the second input image (as discussed earlier), weights of pixels in the transition region of the first input image decreases on going away from the inner boundary of the transition region of the first input image towards the outer boundary of the transition region of the first input image, while weights of pixels in the transition region of the second input image increases on going away from the inner boundary of the transition region of the second input image towards the outer boundary of the transition region of the second input image.

It will also be appreciated that the at least one server would only need to assign weights to pixels of the corresponding portion of the second input image, and need not assign weights to pixels of the non-overlapping portion of the second input image for generating the single output image. This is because the pixels of the non-overlapping portion would always have weight equal to 1, as pixels of the peripheral portion of the single output image are generated entirely from the pixels of the non-overlapping portion of the second input image only (and thus, no blending is involved).

Optionally, when processing the plurality of input images, the at least one server is configured to:

use the at least one neural style transfer network to perform a style transfer on at least the first input image and the second input image to generate a first style-transferred image and a second style-transferred image, respectively; and use the at least one neural style transfer network to combine the first input image, the second input image, the first style-transferred image and the second style-transferred image, to generate the single output image.

In this regard, instead of generating pixels values of pixels of (the inner portion and the peripheral portion of) the single output image using only pixel values of pixels of the first style-transferred image and pixel values of pixels of the second style-transferred image (as discussed earlier), the at least one neural style transfer network also uses pixel values of pixels of the first input image and pixel values of pixels of the second input image, in addition to the pixel values of pixels of the first style-transferred image and the pixel values of pixels of the second style-transferred image. Thus, the single output image generated in this manner would be even more realistic and visually-pleasing and consistent throughout its field of view.

Optionally, when performing said combination, the at least one neural style transfer is used to blend the first input image, the corresponding portion of the second input image, the first style-transferred image, and a corresponding portion of the second style-transferred image together. In this regard, a pixel value of a pixel in the inner portion of the single output image is generated by combining a pixel value of a pixel in the first input image, a pixel value of a corresponding pixel in the corresponding portion of the second input image, a pixel value of a corresponding pixel in the first style-transferred image, and a pixel value of a corresponding pixel in a corresponding portion of the second style-transferred image. The corresponding portion of the second style-transferred image pertains to the overlapping portion of the second field of view. Optionally, when performing said combination, the at least one neural style transfer is used to blend the non-overlapping portion of the second input image with the non-overlapping portion of the second style-transferred image. In this regard, a pixel value of a pixel in the peripheral portion of the single output image is generated by combining a pixel value of a corresponding pixel in the non-overlapping portion of the second input image and a pixel value of a corresponding pixel in a non-overlapping portion of the second style-transferred image. The non-overlapping portion of the second style-transferred image pertains to the non-overlapping portion of the second field of view. The aforesaid combination could be based on a weighted sum or a weighted average of the aforesaid pixel values. It will be appreciated that a same style transfer is performed on both the first input image as well as the second input image according to the style of any of: the set of images captured by the first input camera, the set of reference images.

It will also be appreciated that the at least one neural style transfer network comprises a cascade of neural style transfer networks, wherein a first neural style transfer network of said cascade is used to perform the aforesaid style transfer to generate the first style-transferred image and the second style-transferred image, and a second neural style transfer network of said cascade is used to combine the first input image, the second input image, the first style-transferred image and the second style-transferred image.

Optionally, when processing the plurality of input images to generate the single output image, the at least one server is further configured to use the at least one neural style transfer network to perform at least one of: a noise structure and amplitude matching operation, a colour space matching operation, a brightness matching operation, a beautification and stylification operation, a distortion pixelization correction operation. A "noise structure matching operation" involves matching a noise structure of the first input image with a noise structure of the second input image. The term "noise" refers to a random variation in colour values and luminance values of pixels of an image, that could occur due to various factors, such as sensor noise, compression artifacts, and the like. The noise structure means a type of noise such as a Gaussian noise, a salt-and-pepper noise, and the like. An "amplitude matching operation" ensures that a magnitude of the noise is accurately adjusted to make the single output image visually consistent in terms of noise patterns/structures. The "colour space matching operation" involves transforming colours of the first input image to match a colour space of the second input image, and vice versa. It ensures that both the first input image and the second input image have a same colour space (such as RGB colour space, YUV colour space, or the like), which can be useful for blending or combining these images seamlessly. The "brightness matching operation" is performed to adjust a brightness level of one of the first input image and the second input image to match a brightness level of another of the first input image and the second input image. This ensures that an overall brightness or exposure of both input images is consistent, making them visually harmonious when combined together to generate the single output image. The "beautification and stylification operation" involves enhancing a visual appearance of the single output image to make it more aesthetically-pleasing or to give it a specific artistic style. This operation may employ various image processing algorithms, such as an image denoising algorithm, an image sharpening algorithm, a colour conversion algorithm, an auto white balancing algorithm, a deblurring algorithm, a contrast enhancement algorithm, a low-light enhancement algorithm, a tone mapping algorithm, a super-resolution algorithm, and an image compression algorithm, and the like. The "distortion pixelization correction operation" involves applying a distortion correction effect to different distortion pixelizations in the input images, thereby making the pixelization appear similar in the single output image. It will be appreciated that distortion pixelization of a given image depends on a lens distortion profile of a camera lens of a given input camera. Such a distortion pixelization occurs due to extension of pixels during rectification. As different input cameras typically have different lens distortion profiles, they have different distortion pixelizations. All the aforesaid operations are well-known in the art.

The present disclosure also relates to the method as described above. Various embodiments and variants disclosed above, with respect to the aforementioned system, apply mutatis mutandis to the method.

In a first embodiment, in the method, the step of processing the plurality of input images comprises using the at least one neural style transfer network to combine at least the first input image and the second input image, whilst blending the first input image with a corresponding portion of the second input image that pertains to the overlapping portion of the second field of view.

In a second embodiment, in the method, the step of processing the plurality of input images comprises:

identifying respective gaze regions in the first input image and the second input image, based on a given gaze direction; and using the at least one neural style transfer network to combine at least the first input image and the second input image, whilst blending the respective gaze regions of the first input image and the second input image.

In a third embodiment, in the method, the step of processing the plurality of input images comprises:

identifying respective gaze regions in the first input image and the second input image, based on a given gaze direction;

detecting when a gaze region of the second input image is in a proximity of a boundary between the overlapping portion of the second field of view and a non-overlapping portion of the second field of view;

when it is detected that the gaze region is in the proximity of the boundary, identifying respective surrounding regions in the first input image and the second input image that include and surround the respective gaze regions; and using the at least one neural style transfer network to combine at least the first input image and the second input image, whilst blending the respective surrounding regions of the first input image and the second input image.

In a fourth embodiment, in the method, the step of processing the plurality of input images comprises using the at least one neural style transfer network to combine at least the first input image and the second input image, whilst blending a transition region of the first input image with a transition region of the second input image, wherein an outer boundary of the transition region of the first input image and an outer boundary of the transition region of the second input image represent a boundary between the overlapping portion of the second field of view and a non-overlapping portion of the second field of view.

Optionally, in the method, the aforesaid blending is performed using different blending weights for the first input image and the second input image.

Optionally, in the method, the step of processing the plurality of input images comprises:

using the at least one neural style transfer network to perform a style transfer on at least the first input image and the second input image to generate a first style-transferred image and a second style-transferred image, respectively; and using the at least one neural style transfer network to combine the first input image, the second input image, the first style-transferred image and the second style-transferred image, to generate the single output image.

Optionally, the method further comprises training the at least one neural style transfer network to generate output images in a style of any one of: a set of images captured by the first input camera, a set of reference images.

Optionally, in the method, the step of processing the plurality of input images comprises using the at least one neural style transfer network to generate the single output image in a style of any one of: a set of images captured by the first input camera, a set of reference images.

DETAILED DESCRIPTION OF THE DRAWINGS

Referring to FIG. 1, illustrated is a block diagram of an architecture of a system 100 for processing images using a neural style transfer network, in accordance with an embodiment of the present disclosure. The system 100 comprises at least one server (depicted as a server 102). Optionally, the system 100 further comprises at least one data repository (depicted as a data repository 104) communicably coupled to the server 102. Optionally, the system 100 further comprises at least a first input camera per eye (for example, depicted as first input cameras 106*a* and 106*b* for a first eye and a second eye, respectively) and a second input camera per eye (for example, depicted as second input cameras 108*a* and 108*b* for the first eye and the second eye, respectively). The first input cameras 106*a-b* and the second input cameras 108*a-b* may be communicably coupled to the server 102.

It may be understood by a person skilled in the art that the FIG. 1 includes a simplified architecture of the system 100 for sake of clarity, which should not unduly limit the scope of the claims herein. It is to be understood that the specific implementation of the system 100 is provided as an example and is not to be construed as limiting it to specific numbers or types of servers, data repositories, and input cameras. The person skilled in the art will recognize many variations, alternatives, and modifications of embodiments of the present disclosure.

Figure 2:
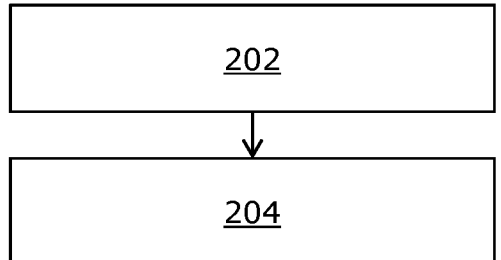
FIG. 2 illustrates steps of a method for processing images using a neural style transfer network, in accordance with an embodiment of the present disclosure.

Referring to FIG. 2, illustrated are steps of a method for processing images using a neural style transfer network, in accordance with an embodiment of the present disclosure. At step 202, a plurality of input images are obtained, the plurality of input images being captured by a plurality of input cameras comprising at least a first input camera per eye and a second input camera per eye, wherein a first field of view of the first input camera is narrower than a second field of view of the second input camera and is overlapping with an overlapping portion of the second field of view, the plurality of input images comprising at least a first input image and a second input image captured by the first input camera and the second input camera, respectively. At step 204, the plurality of input images are processed by using at least one neural style transfer network, to generate a single output image per eye.

The aforementioned steps are only illustrative and other alternatives can also be provided where one or more steps are added, one or more steps are removed, or one or more steps are provided in a different sequence without departing from the scope of the claims herein.

Figure 3:
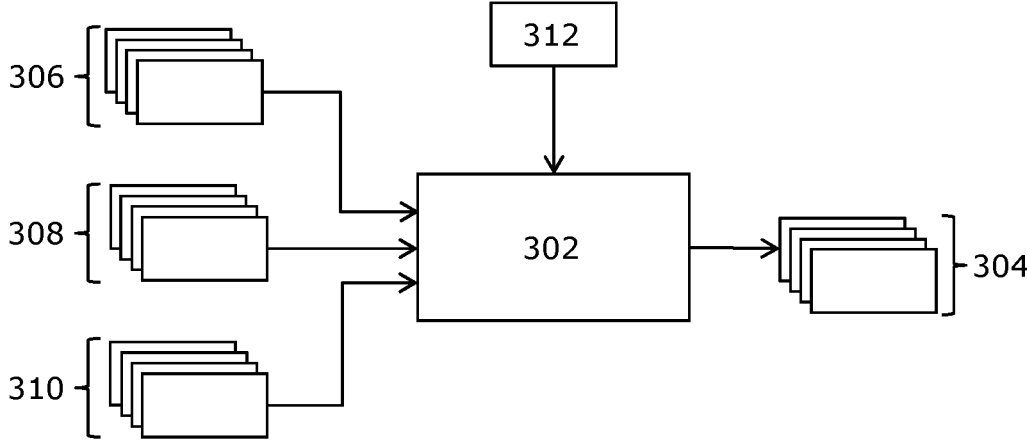
FIG. 3 is a schematic illustration of training a neural style transfer network to generate an output image, in accordance with an embodiment of the present disclosure.

Referring to FIG. 3 illustrates a schematic illustration of training a neural style transfer network 302 to generate output images 304, in accordance with an embodiment of the present disclosure. As shown, an input of the neural style transfer network 302 comprises a plurality of input images 306, a plurality of auxiliary input images 308, and a plurality of pairs of stereo images 310, while an output of the neural style transfer network comprises the output images 304. The plurality of input images 306 are captured using at least a first input camera (namely, a telephoto camera) per eye and a second input camera per eye, wherein a first field of view of the first input camera is narrower than a second field of view of the second input camera and is overlapping with an overlapping portion of the second field of view. The plurality of auxiliary input images 308 could comprise depth images captured, for example, using a depth camera per eye. The plurality of pairs of stereo images 310 could be captured, for example, using at least one pair of stereo cameras. Moreover, the input of the neural style transfer network 302 further comprises information pertaining to a target style 312 in which the output images 304 are to be generated by the neural style transfer network 302. The target style 312 could be any one of: a set of images captured by the first input camera, a set of reference images. The set of reference images could be captured, for example, by a high-quality professional camera having a high resolution (for example, in terms of high pixels per degree (PPD), such as 60 PPD or higher). At least one server (not shown) is configured to train the neural style transfer network 302 in the aforesaid manner.

Referring to FIGS. 4A, 4B, 4C, and 4D, illustrated are different exemplary output images 402a, 402b, 402c, and 402d generated upon processing a first input image 404 and a second input image 406, in accordance with various embodiments of the present disclosure. With reference to FIGS. 4A-4D, the first input image 404 and the second input image 406 are captured by a first input camera and a second input camera, respectively, wherein a first field of view of the first input camera is narrower than a second field of view of the second input camera and is overlapping with an overlapping portion of the second field of view. For sake of simplicity and clarity, instead of illustrating the first input image 404 and the second input image 406 individually, a combined view of the first input image 404 and the second input image 406 is represented within the field of view of the output images 402a-d. Notably, at least one server is configured to use at least one neural style transfer network for generating any of the output images 402a-d.

Figures 4A, 4B:
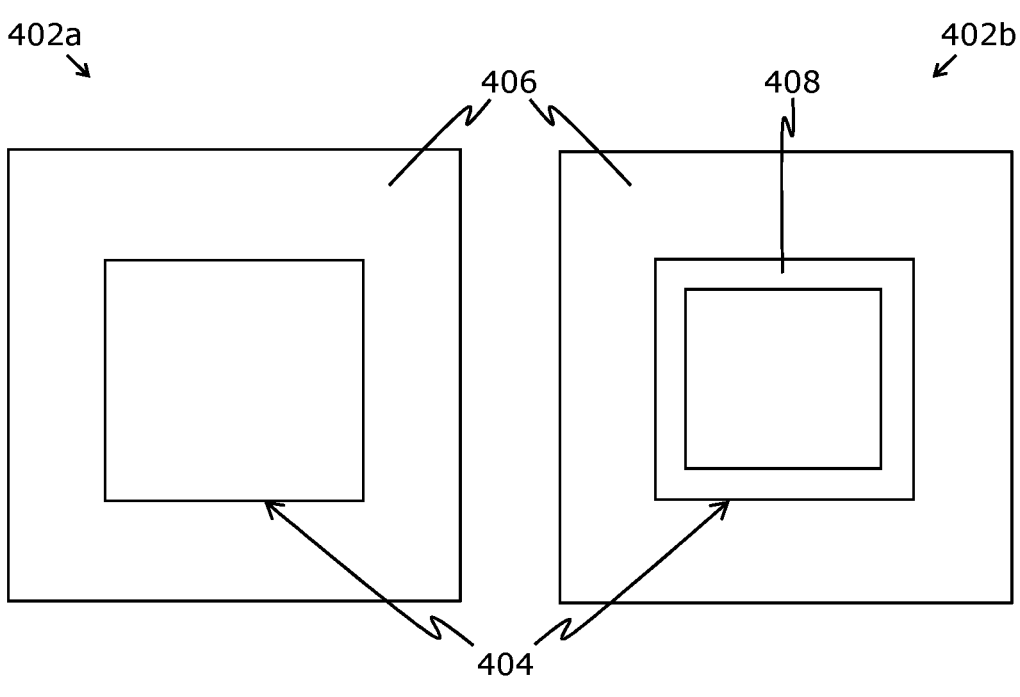
FIGS. 4A, 4B, 4C, and 4D illustrate exemplary output images generated upon processing a plurality of input images in different ways, in accordance with various embodiments of the present disclosure.

With reference to FIG. 4A, the output image 402a is generated by combining the first input image 404 and the second input image 406, whilst blending the first input image 404 with a corresponding portion of the second input image 406 that pertains to the overlapping portion of the second field of view.

With reference to FIG. 4B, the output image 402b is generated by combining the first input image 404 and the second input image 406, whilst blending a transition region 408 of the first input image 404 with a transition region 408 of the second input image 406, wherein an outer boundary of the transition region 408 of the first input image 404 and an outer boundary of the transition region 408 of the second input image 406 represent a boundary between the overlapping portion and a non-overlapping portion of the second field of view. It will be appreciated that the first input image 404 and the second input image 406 have individual (i.e., respective) transition regions. However, when generating the output image 402b, said individual transition regions would overlap with each other, and appear to be a single transition region. Therefore, said individual transition regions are depicted using a same reference numeral 408, for sake of convenience only.

Figures 4C, 4D:
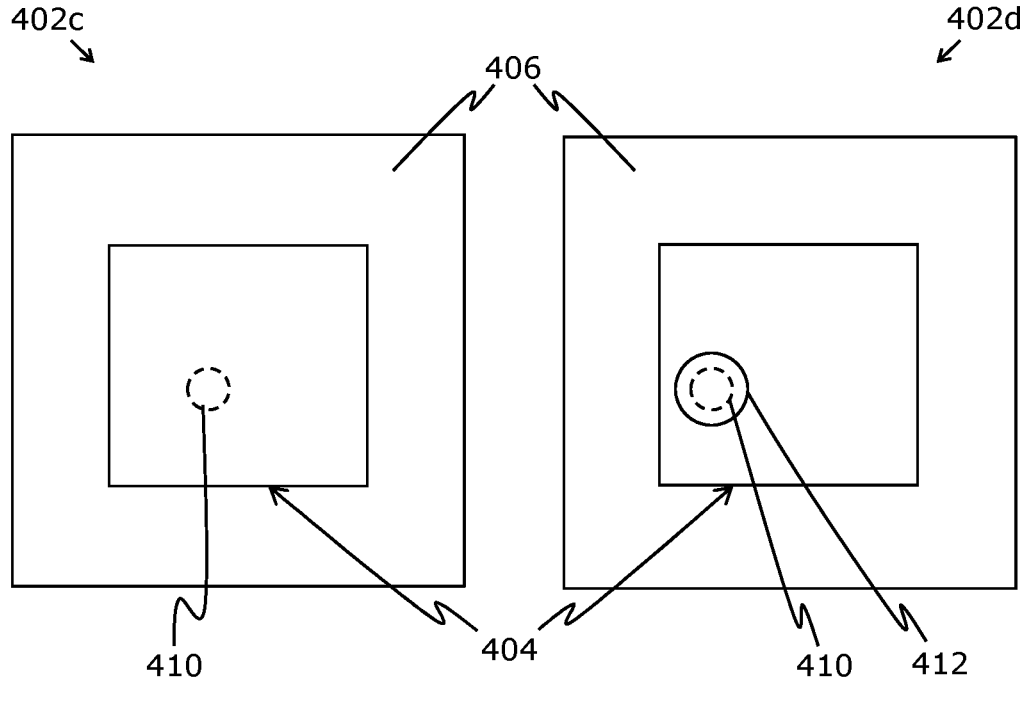

With reference to FIG. 4C, the output image 402c is generated by combining the first input image 404 and the second input image 406, whilst blending respective gaze regions 410 (depicted using a dashed circle) of the first input image 404 and the second input image 406. With reference to FIGS. 4C and 4D, it will be appreciated that the first input image 404 and the second input image 406 have individual (i.e., respective) gaze regions. However, when generating the output image 402c (with reference to FIG. 4C) and the output image 402d (with reference to FIG. 4D), said individual gaze regions would overlap with each other, and appear to be a single gaze region. Therefore, said individual gaze regions are depicted using a same reference numeral 410, for sake of convenience only.

With reference to FIG. 4D, the gaze region 410 of the second input image is in a proximity of a boundary between the overlapping portion and a non-overlapping portion of the second field of view. Therefore, at least one server is configured to identify respective surrounding regions 412 (depicted using a solid circle) in the first input image 404 and the second input image 406 that include and surround the respective gaze regions 410. The output image 402d is generated by combining the first input image 404 and the second input image 406, whilst blending the respective surrounding regions 412 of the first input image 404 and the second input image 406. It will be appreciated that the first input image 404 and the second input image 406 have individual (i.e., respective) surrounding regions. However, when generating the output image 402d, said individual surrounding regions would overlap with each other, and appear to be a single surrounding region. Therefore, said individual surrounding regions are depicted using a same reference numeral 412, for sake of convenience only.

FIGS. 3 and 4A-4D are merely examples, which should not unduly limit the scope of the claims herein. The person skilled in the art will recognize many variations, alternatives, and modifications of embodiments of the present disclosure.

The invention claimed is:

1. A system comprising at least one server configured to:

obtain a plurality of input images captured by a plurality of input cameras comprising at least a first input camera per eye and a second input camera per eye, wherein a first field of view of the first input camera is narrower than a second field of view of the second input camera and is overlapping with an overlapping portion of the second field of view, the plurality of input images comprising at least a first input image and a second input image captured by the first input camera and the second input camera, respectively; and process the plurality of input images, by using at least one neural style transfer network, to generate a single output image per eye;

wherein when processing the plurality of input images, the at least one server is configured to:

identify respective gaze regions in the first input image and the second input image, based on a given gaze direction;

detect when a gaze region of the second input image is in a proximity of a boundary between the overlapping portion of the second field of view and a non-overlapping portion of the second field of view;

when it is detected that the gaze region is in the proximity of the boundary, identify respective surrounding regions in the first input image and the second input image that include and surround the respective gaze regions; and use the at least one neural style transfer network to combine at least the first input image and the second input image, whilst blending the respective surrounding regions of the first input image and the second input image.

2. The system of claim 1, wherein when processing the plurality of input images, the at least one server is configured to use the at least one neural style transfer network to combine at least the first input image and the second input image, whilst blending the first input image with a corresponding portion of the second input image that pertains to the overlapping portion of the second field of view.

3. The system of claim 1, wherein when processing the plurality of input images, the at least one server is configured to:

identify respective gaze regions in the first input image and the second input image, based on a given gaze direction; and use the at least one neural style transfer network to combine at least the first input image and the second input image, whilst blending the respective gaze regions of the first input image and the second input image.

4. The system of claim 2, wherein said blending is performed using different blending weights for the first input image and the second input image.

5. The system of claim 1, wherein the at least one server is configured to train the at least one neural style transfer network to generate output images in a style of any one of: a set of images captured by the first input camera, a set of reference images.

6. The system of claim 1, wherein when processing the plurality of input images, the at least one server is configured to use the at least one neural style transfer network to generate the single output image in a style of any one of: a set of images captured by the first input camera, a set of reference images.

7. A system comprising at least one server configured to:

obtain a plurality of input images captured by a plurality of input cameras comprising at least a first input camera per eye and a second input camera per eye, wherein a first field of view of the first input camera is narrower than a second field of view of the second input camera and is overlapping with an overlapping portion of the second field of view, the plurality of input images comprising at least a first input image and a second input image captured by the first input camera and the second input camera, respectively; and process the plurality of input images, by using at least one neural style transfer network, to generate a single output image per eye;

wherein when processing the plurality of input images, the at least one server is configured to use the at least one neural style transfer network to combine at least the first input image and the second input image, whilst blending a transition region of the first input image with a transition region of the second input image, wherein an outer boundary of the transition region of the first input image and an outer boundary of the transition region of the second input image represent a boundary between the overlapping portion of the second field of view and a non-overlapping portion of the second field of view.

8. A system comprising at least one server configured to:

obtain a plurality of input images captured by a plurality of input cameras comprising at least a first input camera per eye and a second input camera per eye, wherein a first field of view of the first input camera is narrower than a second field of view of the second input camera and is overlapping with an overlapping portion of the second field of view, the plurality of input images comprising at least a first input image and a second input image captured by the first input camera and the second input camera, respectively; and process the plurality of input images, by using at least one neural style transfer network, to generate a single output image per eye;

wherein when processing the plurality of input images, the at least one server is configured to use the at least one neural style transfer network to combine at least the first input image and the second input image, whilst blending the first input image with a corresponding portion of the second input image that pertains to the overlapping portion of the second field of view;

wherein when processing the plurality of input images, the at least one server is configured to:

use the at least one neural style transfer network to perform a style transfer on at least the first input image and the second input image to generate a first style-transferred image and a second style-transferred image, respectively; and use the at least one neural style transfer network to combine the first input image, the second input image, the first style-transferred image and the second style-transferred image, to generate the single output image.

9. A method comprising:

obtaining a plurality of input images captured by a plurality of input cameras comprising at least a first input camera per eye and a second input camera per eye, wherein a first field of view of the first input camera is narrower than a second field of view of the second input camera and is overlapping with an overlapping portion of the second field of view, the plurality of input images comprising at least a first input image and a second input image captured by the first input camera and the second input camera, respectively; and processing the plurality of input images by using at least one neural style transfer network, to generate a single output image per eye;

wherein the step of processing the plurality of input images comprises:

identifying respective gaze regions in the first input image and the second input image, based on a given gaze direction;

detecting when a gaze region of the second input image is in a proximity of a boundary between the overlapping portion of the second field of view and a non-overlapping portion of the second field of view;

when it is detected that the gaze region is in the proximity of the boundary, identifying respective surrounding regions in the first input image and the second input image that include and surround the respective gaze regions; and using the at least one neural style transfer network to combine at least the first input image and the second input image, whilst blending the respective surrounding regions of the first input image and the second input image.

10. The method of claim 9, wherein the step of processing the plurality of input images comprises using the at least one neural style transfer network to combine at least the first input image and the second input image, whilst blending the first input image with a corresponding portion of the second input image that pertains to the overlapping portion of the second field of view.

11. The method of claim 9, wherein the step of processing the plurality of input images comprises:

identifying respective gaze regions in the first input image and the second input image, based on a given gaze direction; and using the at least one neural style transfer network to combine at least the first input image and the second input image, whilst blending the respective gaze regions of the first input image and the second input image.

12. A method comprising:

obtaining a plurality of input images captured by a plurality of input cameras comprising at least a first input camera per eye and a second input camera per eye, wherein a first field of view of the first input camera is narrower than a second field of view of the second input camera and is overlapping with an overlapping portion of the second field of view, the plurality of input images comprising at least a first input image and a second input image captured by the first input camera and the second input camera, respectively; and processing the plurality of input images by using at least one neural style transfer network, to generate a single output image per eye;

wherein the step of processing the plurality of input images comprises using the at least one neural style transfer network to combine at least the first input image and the second input image, whilst blending a transition region of the first input image with a transition region of the second input image, wherein an outer boundary of the transition region of the first input image and an outer boundary of the transition region of the second input image represent a boundary between the overlapping portion of the second field of view and a non-overlapping portion of the second field of view.

13. A method comprising:

obtaining a plurality of input images captured by a plurality of input cameras comprising at least a first input camera per eye and a second input camera per eye, wherein a first field of view of the first input camera is narrower than a second field of view of the second input camera and is overlapping with an overlapping portion of the second field of view, the plurality of input images comprising at least a first input image and a second input image captured by the first input camera and the second input camera, respectively; and processing the plurality of input images by using at least one neural style transfer network, to generate a single output image per eye;

wherein the step of processing the plurality of input images comprises using the at least one neural style transfer network to combine at least the first input image and the second input image, whilst blending the first input image with a corresponding portion of the second input image that pertains to the overlapping portion of the second field of view;

wherein the step of processing the plurality of input images comprises:

using the at least one neural style transfer network to perform a style transfer on at least the first input image and the second input image to generate a first style-transferred image and a second style-transferred image, respectively; and using the at least one neural style transfer network to combine the first input image, the second input image, the first style-transferred image and the second style-transferred image, to generate the single output image.

* * * * *